(12) United States Patent
Yang

(10) Patent No.: US 9,143,788 B2
(45) Date of Patent: Sep. 22, 2015

(54) MULTIPLE THREAD VIDEO ENCODING USING HRD INFORMATION SHARING AND BIT ALLOCATION WAITING

(75) Inventor: Hua Yang, Princeton, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 622 days.

(21) Appl. No.: 12/998,374

(22) PCT Filed: Nov. 12, 2009

(86) PCT No.: PCT/US2009/006084
§ 371 (c)(1),
(2), (4) Date: Apr. 13, 2011

(87) PCT Pub. No.: WO2010/056327
PCT Pub. Date: May 20, 2010

(65) Prior Publication Data
US 2011/0206138 A1 Aug. 25, 2011

Related U.S. Application Data

(60) Provisional application No. 61/199,180, filed on Nov. 13, 2008.

(51) Int. Cl.
*H04N 19/114* (2014.01)
*H04N 19/159* (2014.01)
(Continued)

(52) U.S. Cl.
CPC .......... *H04N 19/114* (2014.11); *H04N 19/115* (2014.11); *H04N 19/142* (2014.11); *H04N 19/152* (2014.11); *H04N 19/159* (2014.11); *H04N 19/177* (2014.11); *H04N 19/436* (2014.11); *H04N 19/61* (2014.11)

(58) Field of Classification Search
CPC .......... H04N 7/26047; H04N 7/26053; H04N 7/26143; H04N 7/26186; H04N 7/26212; H04N 7/2626; H04N 7/26755; H04N 7/50; H04N 19/114; H04N 19/115; H04N 19/142; H04N 19/152; H04N 19/159; H04N 19/177; H04N 19/436; H04N 19/61
USPC .................................................. 375/240.16
See application file for complete search history.

(56) References Cited

U.S. PATENT DOCUMENTS 5,982,436 A 11/1999 Balakrishnan et al.
6,208,691 B1 * 3/2001 Balakrishnan et al. .. 375/240.12
(Continued)

FOREIGN PATENT DOCUMENTS

CN 101287112 A 10/2008
JP 10-304375 11/1998
(Continued)

OTHER PUBLICATIONS

Search Report—dated Jan. 14, 2010.

*Primary Examiner* — Anner Holder
(74) *Attorney, Agent, or Firm* — Robert D. Shedd; Richard LaPeruta

(57) ABSTRACT

A method of encoding video wherein multiple threads of GOPs are encoding in parallel from a buffer in a single pass. In the buffer GOPs having fewer frames than a low frame threshold at the end of a scene are merged with a preceding GOP. Hypothetical reference decoder (HRD) information is stored in the buffer for each GOP and HRD information for neighboring GOPs are merged in the buffer.

15 Claims, 4 Drawing Sheets

Coded sequence:

GOP_i

Thread 1:

GOP_(i+1)

Thread 2:

GOP_(i+2) GOP_(i+3)

Thread 3:

GOP_(i+4)

Thread 4:

(51) Int. Cl.
*H04N 19/115* (2014.01)
*H04N 19/61* (2014.01)
*H04N 19/142* (2014.01)
*H04N 19/152* (2014.01)
*H04N 19/177* (2014.01)
*H04N 19/436* (2014.01)

(56) References Cited

U.S. PATENT DOCUMENTS

| | | |
|---|---|---|
| 6,963,608 B1 | 11/2005 | Wu |
| 2002/0021756 A1 | 2/2002 | Jayant et al. |
| 2004/0172631 A1 | 9/2004 | Howard |
| 2004/0230794 A1* | 11/2004 | England et al. .............. 713/164 |
| 2006/0012728 A1 | 1/2006 | Watamura |
| 2006/0050971 A1 | 3/2006 | Page et al. |
| 2006/0126728 A1 | 6/2006 | Yu et al. |
| 2006/0159169 A1* | 7/2006 | Hui et al. .............. 375/240.03 |
| 2006/0256854 A1 | 11/2006 | Jiang |
| 2007/0002964 A1 | 1/2007 | Xu |
| 2008/0055529 A1 | 3/2008 | Shirasaka et al. |
| 2008/0075164 A1 | 3/2008 | Matsumura |
| 2008/0232459 A1* | 9/2008 | Auyeung .............. 375/240.01 |

FOREIGN PATENT DOCUMENTS

| | | |
|---|---|---|
| JP | 11-027662 A | 1/1999 |
| JP | 2000-511740 | 9/2000 |
| JP | 2008-085673 A | 4/2008 |
| JP | 2008-541663 A | 11/2008 |

\* cited by examiner ial Application No. 61/199,180, filed Nov. 13, 2008 and incorporated herein.
MULTIPLE THREAD VIDEO ENCODING USING HRD INFORMATION SHARING AND BIT ALLOCATION WAITING

CROSS-REFERENCE TO RELATED APPLICATIONS

This application claims the benefit of U.S. Provisional Application No. 61/199,180, filed Nov. 13, 2008 and incorporated herein.

This application claims the benefit, under 35 U.S.C. §365 of International Application PCT/US2009/006,084, filed 12 Nov. 2009, which was published in accordance with PCT Article 21(2) on 20 May 2010, in English.

FIELD OF THE INVENTION

The invention is related to video encoding and more particularly to supporting HRD (hypothetical reference decoder) conformance in a GOP (group-of-pictures)-parallel single-pass video encoder with multiple threads using HRD information sharing and bit allocation waiting.

BACKGROUND OF THE INVENTION

HRD conformance is a necessary requirement for an encoded video bitstream to be successfully delivered in a practical video streaming system, where the coded bitstream needs to be transmitted to a remote client decoder over networks, and successfully decoded by the decoder for smooth video playout. A decoder has a decoding buffer of a limited size that will incessantly receive the delivered video bitstream from the network. Meanwhile, the decoding module will take out buffered bitstream of each coding unit (e.g. a frame) from the buffer, and decode and playout the reconstructed video signals. In a practical video streaming system, a decoder buffer is necessary so as to absorb the inevitable jittering of channel transmission rate of nowadays networks, and thus, render incessant and smooth decoded video playout.

Therefore, HRD conformance is essentially the same problem as to satisfy the decoder buffer constraint for a coded video bitstream.

By assuming a set of HRD parameters at the encoder and conforming to the assumed HRD parameters in encoding each frame (or generally slice as in H.264), the resultant coded bitstreams are then able to be successfully decoded by any decoder that conforms to the same set of HRD parameters as well. This facilitates the cooperation among encoders and decoders from different manufactures in video codec related industry. The importance of HRD conformance has been widely recognized and standardized in Annex C of the latest H.264/AVC video coding standard.

In general, the concerned HRD or decoder buffer parameters include: the buffer size, the initial buffer level, and the channel rate, which define a commonly known model of leaky bucket. HRD conformance means when filling the coded bitstream data into the buffer and taking out the bitstream for each coding unit decoding, there will be no buffer overflow or underflow. Therefore, to support HRD conformance, a video encoder has to: (i) keep an exact track of the current buffer level after coding each unit (e.g. frame or field); (ii) based on that, derive the upper and/or lower bounds on next unit's coding bits; (ii) make sure that the coded bits of the unit does not go beyond the bounds. In practice, the buffer constraint problem is addressed by the rate control scheme of a video encoder.

Supporting HRD conformance in a GOP-parallel single-pass video encoder with multiple threads presents a challenging problem to address. In this commonly used architecture in real-time video coding systems, multiple GOPs may be encoded at the same time by multiple encoding threads respectively, and each GOP can only be coded once. Although GOP parallel and single pass encoding easily accelerates the encoding process significantly, a side-effect is that supporting HRD conformance becomes a highly more difficult task than that in the conventional case of GOP-sequential single-thread coding. In GOP-sequential video coding, when coding a GOP, all the preceding frames have already been coded, whose coded bits can, thus, be readily used to exactly track the current buffer level and derive correct bounds for HRD conformance coding. However, in the case of GOP-parallel coding, when a thread is going to code the current GOP, some of its preceding GOPs may still be under coding by some other threads. This is illustrated in FIG. 1, where the shadowed areas represent coded part in a GOP. For those GOPs, the exact coded bits are not known when coding the current GOP, which renders HRD conformance coding impossible.

Generally, in a multi pass system, one has to let each GOP exactly consume all the budget bits that is allocated to it prior to its actual coding. In that way, for those partially coded GOPs, one can just assume their allocated bits to be their final coded bits, and use them to keep track of the buffer status. However, in single-pass real-time video coding scenarios, exactly achieving the pre-allocated bits for any GOP is a highly challenging task for rate control. Note exact GOP bits achievement is much easier and more straightforward if multi-pass coding is allowed. In that case, even though the pre-allocated bit of a GOP may not be exactly achieved by a coded GOP, one can conduct a HRD conformance check given all the GOPs are coded once. If HRD violations (i.e. buffer overflows or underflows) are found, the encoder can re-encode the trouble GOPs with newly allocated bits to prevent violations. After the 2nd pass coding, the encoder can do the HRD check again, and so on till no HRD violation is resulted. However, this HRD adjustment is impossible in single-pass video encoding, where to support HRD conformance, exactly achieving GOP allocated bits is the only way to go.

The decoder buffer constraint or HRD conformance problem has long been considered an important issue in developing practical rate control schemes for video encoders in video streaming applications. However, so far, most of the existing efforts are focused on the scenarios of GOP-sequential single-thread coding, where satisfying the buffer constraint is generally not a challenging problem in practice.

SUMMARY OF THE INVENTION

A method of encoding video is provided wherein multiple threads of GOPs are encoding in parallel from a buffer in a single pass. In the buffer GOPs having fewer frames than a low frame threshold at the end of a scene are merged with a preceding GOP. Hypothetical reference decoder (HRD) information is stored in the buffer for each GOP and HRD information for neighboring GOPs are merged in the buffer. The method can further comprise allocating a number of bits for each GOP wherein the multiple threads may wait for bit allocations for all uncoded GOPs prior to starting of their respective encoding, wherein upon completion of encoding, each encoded thread sends out a respective wait ending semaphore to each of the waiting threads. Additionally, each waiting thread can receive a wait ending semaphore from the encoded thread. To prevent semaphore waiting deadlock, whenever one of the waiting thread ends its waiting after receiving a wait ending semaphore and then immediately sets up a new semaphore waiting for bit allocation result of a new earliest GOP that is prior to its GOP and not allocated bits yet, the new waiting semaphore is a separate and different semaphore than the wait ending semaphore.

A video encoder or the like is provided that comprises a buffer; an encoding module encoding multiple threads of groups of pictures (GOPs) in parallel from the buffer in a single pass; a merging module which merges GOPs having fewer frames than a low frame threshold at the end of a scene with a preceding GOP in the buffer; and, an HRD, HRD-type, or the like information monitoring module storing hypothetical reference decoder (HRD), HRD-type or the like information for each GOP in the buffer, and merging the information for neighboring GOPs in the buffer. The encoder can further comprise an allocation module for allocating a number of bits for each GOP wherein the multiple threads may wait for bit allocations for all uncoded GOPs prior to starting of their respective encoding. The encoder can include a plurality of wait ending semaphores, each sent from an encoded thread to a respective waiting threads. Each waiting thread can receive a wait ending semaphore from the encoded thread. To prevent semaphore waiting deadlock in the encoder, whenever one of the waiting threads ends its waiting after receiving a wait ending semaphore and then immediately sets up a new semaphore waiting for bit allocation result of a new earliest GOP that is prior to its GOP and not allocated bits yet, the new waiting semaphore is a separate and different semaphore than the wait ending semaphore.

BRIEF DESCRIPTION OF THE DRAWINGS

The invention will now be described by way of example with reference to the accompanying figures of which.

DETAILED DESCRIPTION OF THE EMBODIMENTS

Figure 1:
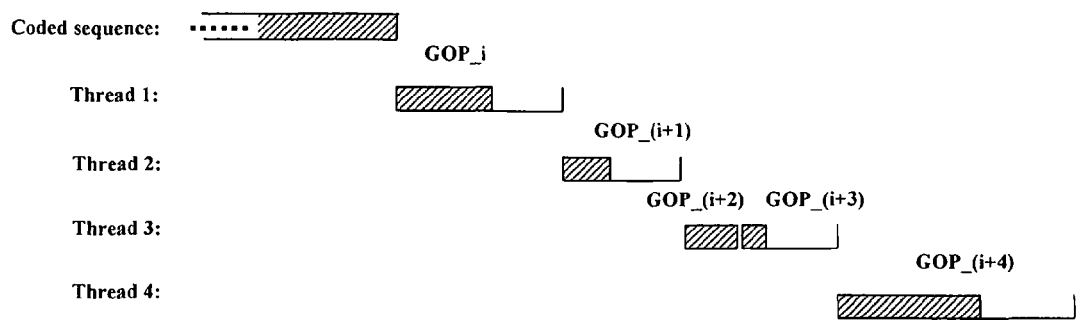
FIG. 1 is a diagram showing parallel coding of multiple GOPs by multiple encoding threads in a real-time video encoder according to the invention.

At least one implementation in this disclosure addresses this very GOP-level exact bit achievement problem, and proposes a comprehensive rate control solution to achieve this goal. The proposed scheme mainly includes: scene-end short GOP merging, bit budget rounding, GOP and frame-level bit reservation, bit overshooting compensated MB-level rate control, filler unit adding, and efficient multi-thread coding information buffering and communication. Extensive testing with a practical single-pass real-time video encoder with multiple threads shows that the proposed scheme always guarantees HRD conformance, where the failure is always rarely seen.

For the concerned scenarios of GOP-parallel multi-thread video coding, if multi-pass GOP coding is allowed, supporting HRD conformance also bears the straightforward and easy to implement solution, i.e. whenever violations are found, re-encoding the related GOPs with HRD adjustment until the whole coded bitstream passes the specified HRD conformance check. Therefore, in that case, although accurate GOP bit achievement is a helpful technique, exact GOP bit achievement is not a must.

However, in at least one implementation in this disclosure, we are concerned with GOP-parallel and single-pass video coding, which is an important and effective architecture for real-time video coding. In this case, exact GOP bit achievement is a must for HRD conformance support, which is a highly challenging problem in practice. This is because video signals are highly non-stationary signals. However, rate control conducts bit allocation or achievement based on estimated models from the past coded video units. Therefore, the mismatch or difference between characteristics of past coded and current coding video units will lead to rate control inaccuracies, and hence, inevitable bit overshootings and undershootings. For effective HRD conformance support, one has to develop techniques to make rate control robust enough to the non-stationarities of video signals, and thus, always exactly achieve the pre-allocated bits for each GOP coding.

At least one embodiment presents an effective comprehensive rate control solution to achieve exact pre-allocated bits for each GOP, which, hence, effectively supports HRD conformance in the case of GOP-parallel single-pass real-time video encoding with multiple threads, as discussed earlier. The proposed solution mainly consists of the following techniques which will be described in greater detail below:

(i) Scene-end short GOP merging: merging the GOP that is too short at a scene-end with its preceding GOP, to avoid possibly highly inaccurate rate control of too-short GOPs.

(ii) Bit budget rounding: pre-allocated bit budget for a GOP and that for the last coding frame in the GOP are both rounded into bytes for bit-exact bit achievement.

(iii) Bit reservation: GOP-level and frame-level bit reservation to prevent short-of-bits situations in frame-level and MB-level bit allocations.

(iv) Bit overshooting compensation: in MB-level rate control, bit overshooting effect is compensated to prevent bit overshooting of coding a frame.

(v) Filler unit adding: proper amount of filler unit bytes are added after the last coded frame in the GOP to finally use up all the remaining bits.

Figure 2:
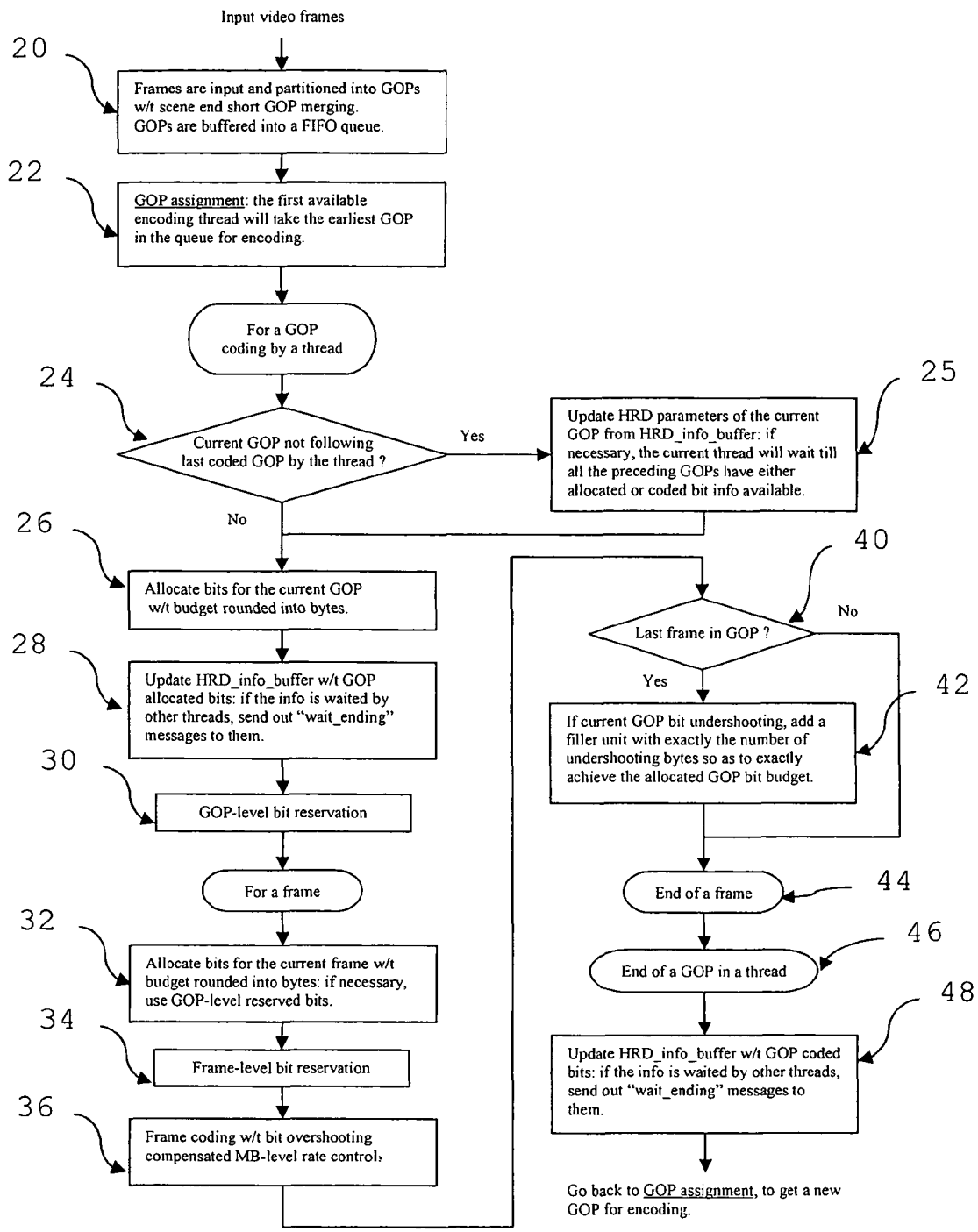
FIG. 2 is a block diagram of the overall framework of the HRD conformance support rate control solution for GOP-parallel multi-thread single-pass real-time video coding according to the invention.

(vi) Multi-thread coding info buffering and communication: it buffers and shares coding info among all the encoding threads, including: effective coded GOP merging for a reduced buffer size, and an inter-thread waiting mechanism with two semaphores, etc. Details of the proposed solution are depicted in FIG. 2. First, at step 20, input frames are partitioned into GOPs which are then buffered into a FIFO (first in first out) queue. In step 22, the first available coding thread will take the earliest available GOP from the top of the queue for encoding. Note that in GOP partition, scene-end short GOP merging is preferred. This is because due to the limited total bit budget of the short GOP, the GOP-level reserved bits to prevent short-of-bits in frame-level bit allocation as mentioned in (iii) are also limited. Thus, bit overshooting is more difficult to be prevented than that for large GOPs. Therefore, if a GOP at the end of a scene is too short (e.g. <5 frames), the GOP will be merged with the preceding GOP to form a larger GOP, which will ease the burden of exact GOP bit achievement for rate control.

Next, at step 24, the thread coding the current GOP will check whether the current GOP is immediately following the last coded GOP by the thread. If so, the thread can just continue keeping track of the buffer status resultant from the last coded GOP. Otherwise, there exist one or more GOPs between the current and the last coded GOPs that are coding or coded by some other threads. In this case, the current thread needs to update the current buffer status based on all the threads' coding info buffered in HRD_info_buffer, which will be explained in details later on. Specifically, for the intermediate GOPs, either their allocated bits or their actual coded bits will be assumed as their final coded bits to derive the current buffer level. If there are GOPs that have not even been allocated bits yet, the current thread will wait for the finish of those GOPs' bit allocation at step 25. Since the time from a GOP assigned to a thread to the finish of the GOP's bit allocation is always negligible, this waiting will not yield serious delay in the encoding. Regarding the inter-thread waiting, another important issue is to avoid waiting deadlock. In practice, it was found that to prevent deadlock, it is necessary to have 2 separate waiting semaphores. Considering FIG. 1, let us assume that when Thread 2, 3, 4 are about to code GOP_(i+1), (i+3), (i+4) respectively, Thread 1 is still not done with GOP_i's bit allocation. Hence, Thread 2,3,4 have to wait for Thread 1's bit allocation to GOP_i. In practice, a commonly used inter-thread communication mechanism is called semaphore. Therefore, when Thread 1's done with GOP_i's bit allocation, it will send out 3 semaphores to those 3 waiting threads. After receiving an expected wait-ending semaphore, a thread will end its waiting status. However, in our case, if Thread 3 or 4 receives a wait-ending semaphore earlier than Thread 2, they will continue their processing and immediately set up a new waiting for GOP_(i+1)'s allocated bits. Therefore, if there is only one waiting semaphore, the new waiting will directly take one more wait-ending semaphore due to the finish of GOP_i's bit allocation. In this case, Thread 2 will not successfully receive its expected wait-ending semaphore from Thread 1, and hence, waiting deadlock. Therefore, 2 separate semaphores are necessary. As such, the new waiting for Thread 2 will not take the wait-ending semaphores from Thread 1, and hence, waiting deadlock will not happen.

As seen in FIG. 2, the thread then moves on to the current GOP coding. First, at step 26 the bit budget of the current GOP will be calculated via GOP-level rate control. Herein, for the present goal of exact GOP allocated bit achievement, one has to round the allocated bit budget into bytes, as in all the nowadays video coding standards (e.g. H.264/AVC), each coding unit (e.g. slice) will be coded into a bitstream with an integer number of bytes. Therefore, GOP bit budget rounding is necessary for exact bit achievement. Similarly, the bit budget for each frame is also rounded into bytes, as shown in FIG. 2.

The current thread will then record the current GOP's allocated bits into HRD_info_buffer. If there exist some other threads waiting for the current GOP's bit allocation result as discussed earlier, the current thread will send out the according number of wait-ending semaphores to notify them the result and end their waiting (step 28).

Then, it comes to step 30 for GOP-level bit reservation. Basically, before coding a GOP, a certain amount of bits is reserved first, in order to prevent the possible short-of-bits situations in bit allocation of the remaining frames. Due to rate control inaccuracies, if there are not enough bits for coding a certain frame, bit overshooting will most likely happen for the frame, which may fail the final exact bit achievement for the GOP. Therefore, bit reservation is necessary. In the current implementation, GOP-level bit reservation and the spending of the reserved bits are carried out as follows. Note that herein bits are separately reserved for preventing short_of_bits situations for the intermediate frames in a GOP, and for coding the last frame, respectively. This is because preventing bit overshooting is critical to the final exact GOP bit achievement, and hence, absolutely of much more importance than that for the other intermediate frames.

GOP-level bit reservation is accomplished in step 30 based on the following formulas:

reserved_bits_to_prevent_FBA_short_of_bits= Round_to_bytes[0.5*min(min(current_GOP_length, 5)*target_bit_rate/frame_rate, curr_GOP_target_bits)*0.1].

reserved_bits_for_the_last_frame=reserved_bits_to_ prevent_FBA_short_of_bits.

curr_GOP_target_bits=curr_GOP_target_bits−reserved_bits_for_the_last_frame−reserved_bits_to_prevent_FBA_short_of bits.

Spending of GOP-level reserved bits in FBA (frame-level bit allocation) is managed in step 32 and is based on the following formulas and logic:

If the current frame is not the last frame in the GOP, and if short_of_bits happens when allocating bits for the frame, use half of the current remaining reserved_bits_to_prevent_FBA_short_of_bits in current frame bit allocation. If still short_of_bits, continue spend half of the remaining reserved bits, until no short_of_bits happens or there is no remaining reserved bits.

If the current frame is the last frame in the GOP, add all the remaining reserved bits, i.e. reserved_bits_for_the_last_ frame plus the remaining reserved_bits_to_prevent_FBA_short_of_bits if any, to its frame target bit budget.

In practice, short_of_bits in FBA should be properly defined to help prevent uncontrolled bit overshooting from frame coding. In our current implementation, it is regarded short_of_bits when for a frame's bit allocation and considering all the remaining bits and all the remaining frames, the estimated remaining bits for prediction residue coding does not represent a significant portion of the total remaining bits e.g. <15%. The estimated remaining bits for prediction residue coding is the total remaining bits excluding the estimated total header bits that includes NAL or VCL unit header, picture header, and MB (macroblock) header, and motion vectors, etc. Because in case of short_of_bits, even though the pre-allocated bits for residue coding is not enough, in practice, to maintain an acceptable coding quality, a minimum number of bits will still be used in coding the residues, and hence, bit overshooting for the coded frame.

Besides GOP-level bit reservation, in practice, frame-level bit reservation techniques according to the invention are shown in steps 50-60 and are as follows. For the last frame in a GOP, curr_frm_target_bits=curr_frm_target_bits*0.8. Otherwise, for the 1st I-frame in a short GOP, i.e. GOP_length<5, curr_frm_target_bits=curr_frm_target_bits*0.9.

Figure 3:
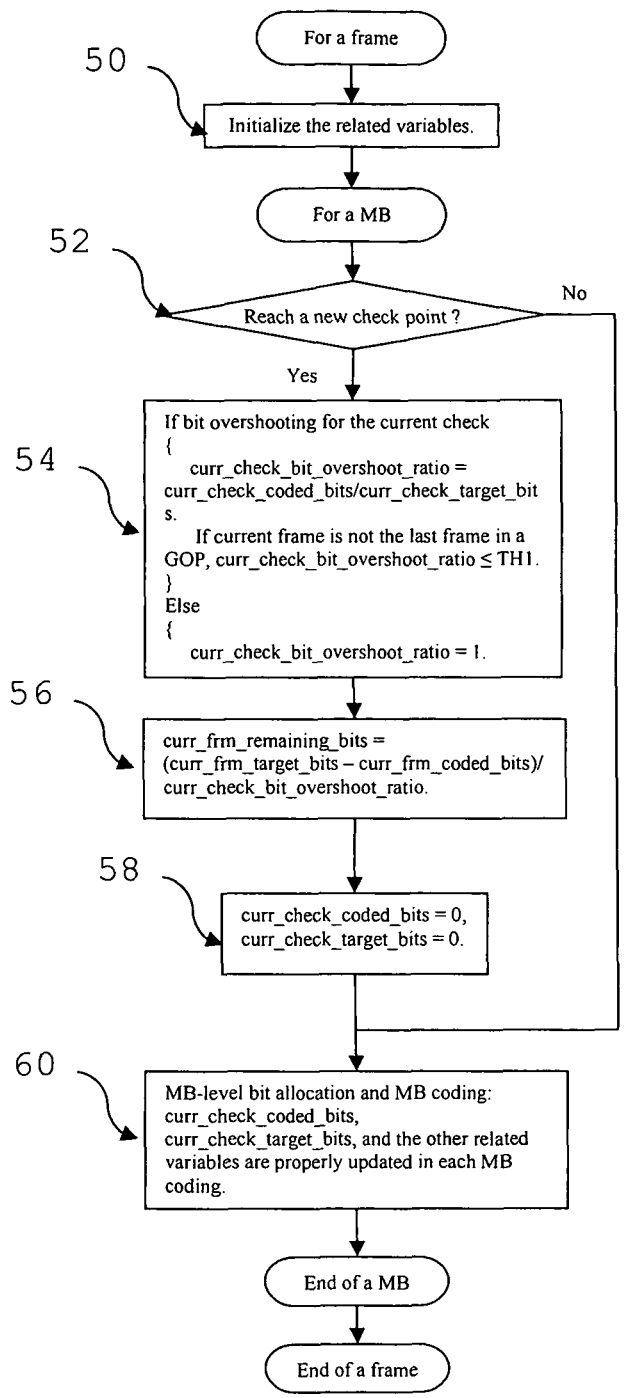
FIG. 3 is a block diagram showing bit overshooting compensated MB-level rate control according to the invention; and, FIG. 4 is a block diagram showing filler unit adding after coding the last frame in a GOP.

Although allocating enough bits for a frame, rate control inaccuracies inside a frame coding may still render the finally coded frame bits exceed the original target. For that sake, we propose another technique for effective frame bit overshooting prevention, i.e. bit overshooting compensated MB-level rate control, which is described in details in FIG. 3. Herein, related variables are initialized at step 50 and the check point (step 52) defines how frequent bit overshooting compensation is conducted in MB-level rate control. Referring to steps 54, 56, in one embodiment, whenever an additional (curr_frm_target_bits*10%) number of bits are coded in a frame, it will be regarded as reaching a new check point. A bit overshooting ratio will be estimated based on the coding results of this newly coded 10% of curr_frm_target_bits, and applied to the remaining target bits to compensate the estimated bit overshooting effect. As seen in FIG. 3, if a frame is not the last frame in a GOP, a relaxed bit overshooting ratio will be used, as bit overshooting prevention is not so urgent in this case as for the last frame coding.

Figure 4:
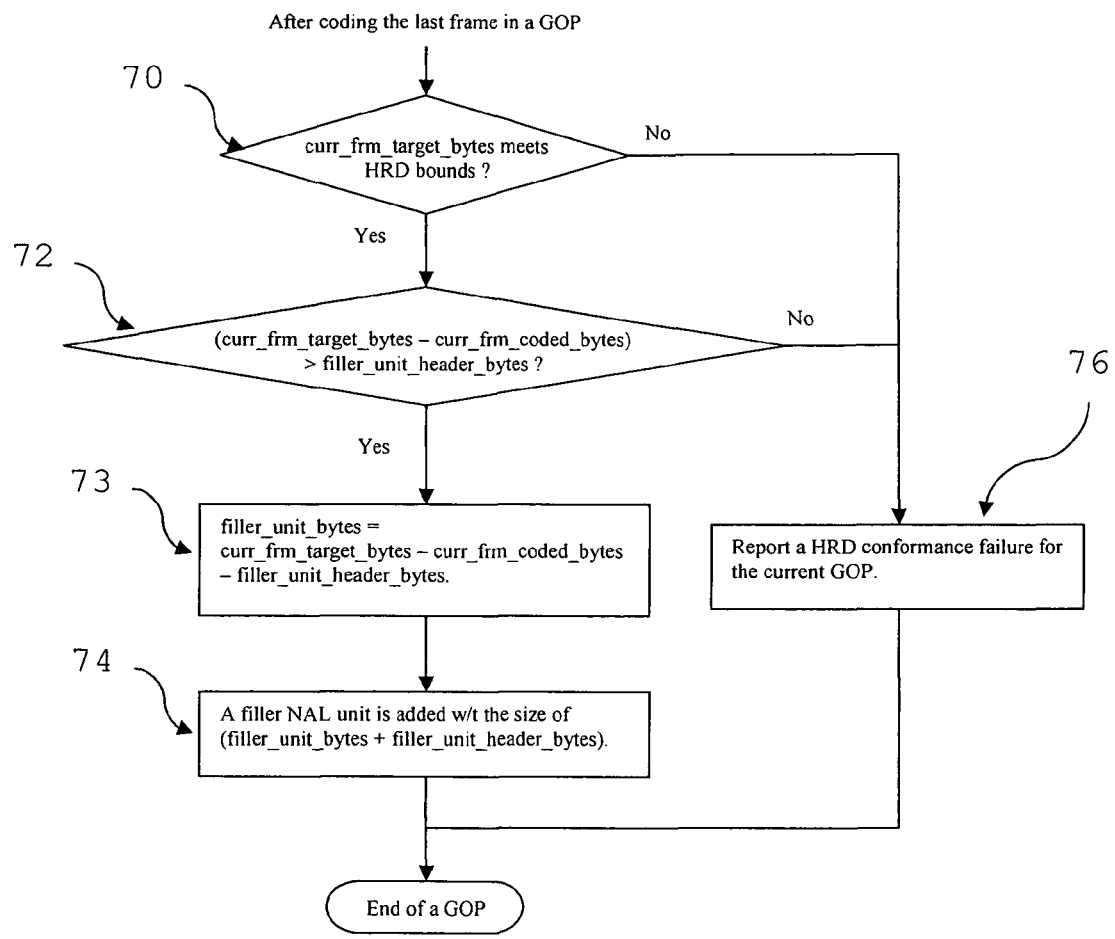

Referring to FIG. 4, finally, after coding all the frames in the GOP, the encoder thread will check whether all the pre-allocated GOP bits have been used at this point. If there still remains significant amount of allocated bits, a filler unit will be added at steps 73, 74 after the coded bitstream of the last frame in the GOP which will consume all the remaining bits so as to render the overall coded bits of the GOP exactly the same as its pre-allocated bits, and hence, successfully support HRD conformance. A filler unit is a dummy unit as defined in H.264/AVC, which contains dummy content only, e.g. bits of all 1s or 0s. The proposed filler unit adding scheme is described in FIG. 4. Herein, for a H.264 defined filler unit, the number of its header bytes is 6. Note that herein curr_frm_tareget_bytes represents the original current frame target bytes before frame-level bit reservation. As seen in FIG. 3, if curr_frm_target_bytes itself conflicts with the HRD upper and/or lower bounds at step 70, HRD conformance will be failed (step 76) even with exact bit achievement of the current GOP. The HRD conformance will also be failed either if there is bit overshooting for the last frame, i.e. curr_frm_target_bytes<curr_frm_coded_bytes, or if the remaining unused allocated bytes are less than the minimum filler unit bytes, i.e. the filler unit header bytes as shown in step 72.

After coding a GOP, the coded GOP bits will be recorded properly in HRD_info_buffer. Note that different from recording the allocated GOP bits, as GOP coding takes much time, thread waiting for GOP coded bits is impractical in real-time video coding scenarios.

Further, a proposed efficient mechanism is introduced for buffering and sharing GOP coding information among the multiple encoding threads. The coding info buffer is denoted as HRD_info_buffer. For conciseness, HRD_info_buffer initialization is not included in FIG. 2. The proposed HRD_info_buffer consists of two parts: (i) one single CodedSeqHrdInfo buffer for buffering the HRD info for all the coded GOPs that can be concatenated together starting from the 1st GOP of the sequence; (ii) (2*total_number_of_threads) CodedGOPHrdInfo buffers for buffering the coding info for all the coding or coded GOPs that cannot be concatenated together with the last GOP in CodedSeqHrdInfo buffer. As illustrated in FIG. 1, CodedGOPHrdInfo is for storing allocated and coded GOP bits for each of the either coded, i.e. GOP_(i+2), or coding GOP, i.e. GOP_i, (i+1), (i+3), (i+4), while CodedSeqHrdInfo records the buffer status info up to the last coded GOP that can be continuously concatenated together with all the past coded GOPs starting from the very beginning of the sequence, i.e. the info of the "Coded sequence" as marked in FIG. 1.

In practice, an effective technique to efficiently manage the CodedGOPHrdInfo buffer is neighboring coded GOP merging, meaning: if there are two coded GOPs in CodedGOPHrdInfo buffer that are neighboring to each other, the two GOPs coded info will be merged together. This merging is involved in "update HRD_info_buffer w/t GOP coded bits" module in FIG. 2, and greatly reduces the buffer size of the proposed CodedGOPHrdInfo buffer. For example, in our current implementation, one can safely set its buffer size to be (2*total_number_of_threads). Otherwise, the buffer size would be (2*total_number_of_threads*max_GOP_length), where max_GOP_length could be very large in practice (e.g. >150).

Finally, it is important to emphasize that extensive testing with a practical GOP-parallel single pass real-time video encoder has been conducted for the proposed HRD conformance support scheme. Results show that with the proposed scheme, HRD failure is rarely seen all the time, and hence, HRD conformance is effectively supported.

Provided is one or more implementations having particular features and aspects. However, features and aspects of described implementations may also be adapted for other implementations. Although implementations described herein may be described in a particular context, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit. Further, a computer readable medium may store the data values produced by an implementation.

As should be evident to one of skill in the art, implementations may also produce a signal formatted to carry information that may be, for example, stored or transmitted. The information may include, for example, instructions for performing a method, or data produced by one of the described implementations.

Additionally, many implementations may be implemented in one or more of an encoder, a pre-processor to an encoder, a decoder, or a post-processor to a decoder. The implementations described or contemplated may be used in a variety of different applications and products. Some examples of applications or products include set-top boxes, cell phones, personal digital assistants (PDAs), televisions, personal recording devices (for example, PVRs, computers running recording software, VHS recording devices), camcorders, streaming of data over the Internet or other communication links, and video-on-demand.

Further, other implementations are contemplated by this disclosure. For example, additional implementations may be created by combining, deleting, modifying, or supplementing various features of the disclosed implementations.

The following list provides a short list of various implementations. The list is not intended to be exhaustive but merely to provide a short description of a small number of the many possible implementations.

1. A GOP-parallel multi-thread single-pass video encoder that adopts the proposed comprehensive rate control solution to support HRD conformance via exact GOP bit achievement.
2. Implementation 1 where exact GOP bit achievement is achieved via including any one or more of the following proposed techniques: (i) scene-end short GOP merging to reduce occurrence of short GOPs, (ii) GOP-level and frame-level bit budget rounding into bytes, (iii) GOP-level bit reservation for short_of_bits prevention in frame-level bit allocation, (iv) frame-level bit reservation, (v) bit overshooting compensation in MB-level rate control, (vi) filler unit adding in the end of coding a GOP, (vii) the multi-thread coding info buffering and communication mechanism with neighboring GOP merging to reduce the buffer size and using two separate interthread waiting semaphores to prevent waiting deadlock.
3. Implementation 2 where in GOP-level bit reservation, bits are separately reserved for intermediate frames of a GOP to prevent short_of_bits situations in their frame-level bit allocation and for the last frame of a GOP to prevent its bit overshooting.
4. Implementation 3 where short_of_bits in frame-level bit allocation is defined as having no sufficient bits for prediction residue coding of a frame.
5. Implementation 2 where bit overshooting compensation in MB-level rate control involves periodic bit overshooting checking, adaptive bit overshooting ratio estimation, and remaining target bits adjustment as defined in FIG. 3.
6. A signal produced from any of the implementations described in this disclosure.
7. Creating, assembling, storing, transmitting, receiving, and/or processing video coding information, including HRD information, according to one or more implementations described in this disclosure.
8. A device (such as, for example, an encoder, a decoder, a pre-processor, or a post-processor) capable of operating according to, or in communication with, one of the described implementations.
9. A device (such as, for example, a computer readable medium) for storing one or HRD conformance engines, or a set of instructions for performing an HRD conformance, according to one or more of the implementations described in this disclosure.
10. A signal formatted to include information relating to an HRD, or relating to an HRD output or operation, according to one or more of the implementations described in this disclosure.
11. Implementation 10, where the signal represents digital information.
12. Implementation 10, where the signal is an electromagnetic wave.
13. Implementation 10, where the signal is a baseband signal.
14. Implementation 10, where the information includes one or more of residue data, motion vector data, and reference indicator data.

These implementations advantageously give a comprehensive solution to ensure each GOP exactly uses the pre-allocated bit budget after coding, no more no less, which effectively supports the HRD conformance in single-pass real-time video encoding systems.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method of encoding video comprising:
   encoding multiple threads of GOPs in parallel from a buffer in a single pass;
   in the buffer, merging GOPs having fewer frames than a low frame threshold at the end of a scene with a preceding GOP;
   storing hypothetical reference decoder (HRD) information for each GOP in the buffer; and, merging the HRD information for neighboring GOPs in the buffer.

2. The method of claim 1 further comprising allocating a number of bits for each GOP wherein the multiple threads can wait for bit allocations for all uncoded GOPs prior to starting of their respective encoding.

3. The method of claim 2 wherein upon completion of encoding, each encoded thread sends out a respective wait ending semaphore to each of the waiting threads.

4. The method of claim 2 wherein each waiting thread receives a wait ending semaphore from the encoded thread.

5. The method of claim 4 wherein to prevent semaphore waiting deadlock, whenever one of the waiting thread ends its waiting after receiving a wait ending semaphore and then immediately sets up a new semaphore waiting for bit allocation result of a new earliest GOP that is prior to its GOP and not allocated bits yet, the new waiting semaphore is a separate and different semaphore than the wait ending semaphore.

6. A video encoder comprising:
   a buffer;
   an encoding module encoding multiple threads of groups of pictures (GOPs) in parallel from the buffer in a single pass;
   a merging module which merges GOPs having fewer frames than a low frame threshold at the end of a scene with a preceding GOP in the buffer; and, an HRD information monitoring module storing hypothetical reference decoder (HRD) information for each GOP in the buffer, and merging the HRD information for neighboring GOPs in the buffer.

7. The encoder of claim 6 further comprising an allocation module allocating a number of bits for each GOP wherein the multiple threads can wait for bit allocations for all uncoded GOPs prior to starting of their respective encoding.

8. The encoder of claim 7 further comprising a plurality of wait ending semaphores, each sent from an encoded thread to a respective waiting threads.

9. The encoder of claim 7 wherein each waiting thread receives a wait ending semaphore from the encoded thread.

10. The encoder of claim 9 wherein to prevent semaphore waiting deadlock, whenever one of the waiting threads ends its waiting after receiving a wait ending semaphore and then immediately sets up a new semaphore waiting for bit allocation result of a new earliest GOP that is prior to its GOP and not allocated bits yet, the new waiting semaphore is a separate and different semaphore than the wait ending semaphore.

11. A method of encoding video comprising:
   encoding multiple threads of GOPs in parallel from a buffer in a single pass;
   in the buffer, merging GOPs having fewer frames than a low frame threshold at the end of a scene with a preceding GOP;
   storing decoder information for each GOP in the buffer; and, merging the information for neighboring GOPs in the buffer.

12. The method of claim 11 further comprising allocating a number of bits for each GOP wherein the multiple threads can wait for bit allocations for all uncoded GOPs prior to starting of their respective encoding.

13. The method of claim 12 wherein upon completion of encoding, each encoded thread sends out a respective wait ending semaphore to each of the waiting threads.

14. The method of claim 12 wherein each waiting thread receives a wait ending semaphore from the encoded thread.

15. The method of claim 14 wherein to prevent semaphore waiting deadlock, whenever one of the waiting thread ends its waiting after receiving a wait ending semaphore and then immediately sets up a new semaphore waiting for bit allocation result of a new earliest GOP that is prior to its GOP and not allocated bits yet, the new waiting semaphore is a separate and different semaphore than the wait ending semaphore.

* * * * *